've

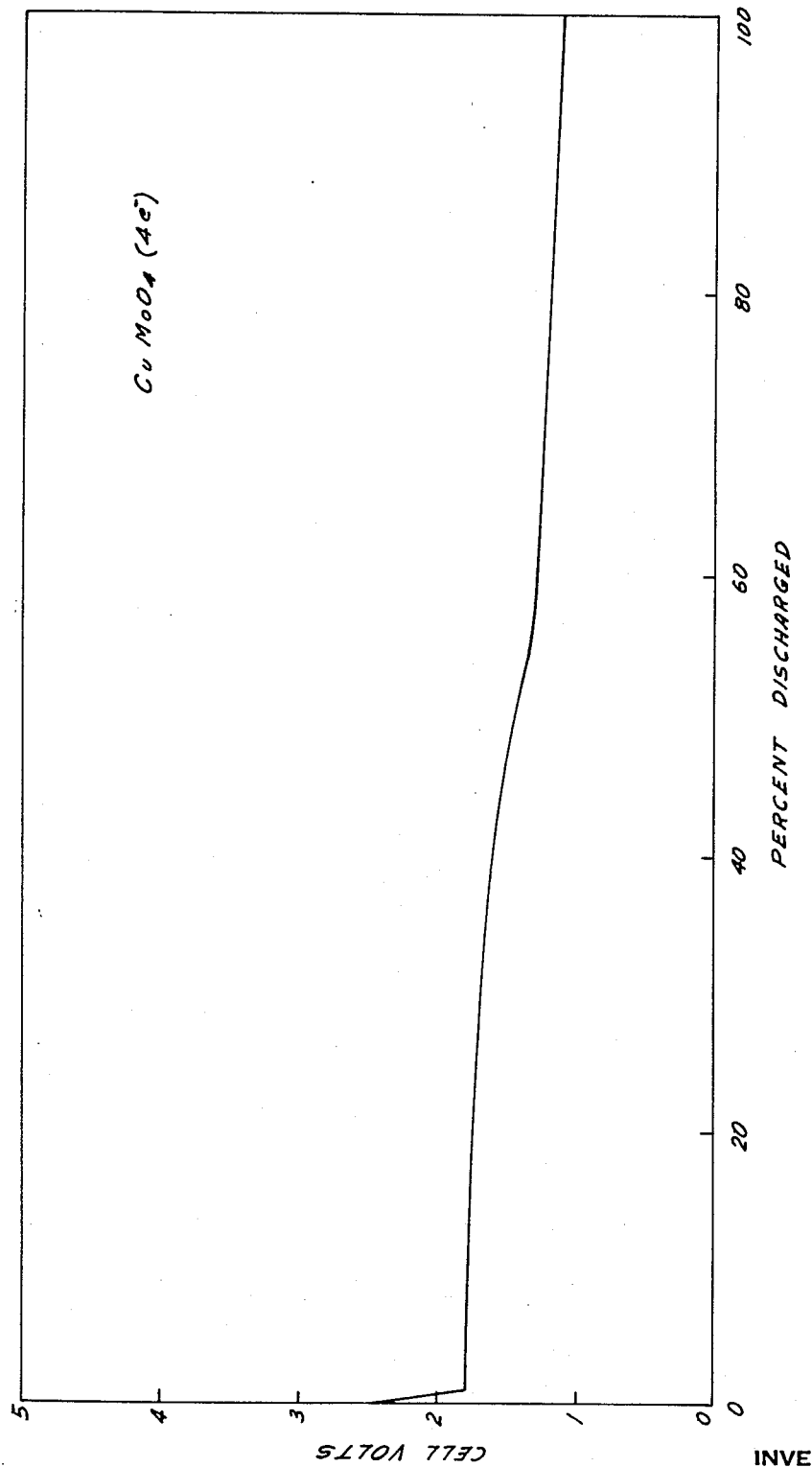

United States Patent Office 3,711,334
Patented Jan. 16, 1973

---

3,711,334
LITHIUM-METAL MOLYBDATE ORGANIC ELECTROLYTE CELL
Arabinda N. Dey, Needham, and Robert W. Holmes, Boston, Mass., assignors to P. R. Mallory & Co. Inc., Indianapolis, Ind.
Filed July 15, 1970, Ser. No. 54,931
Int. Cl. H01m 17/02
U.S. Cl. 136—100 R  4 Claims

ABSTRACT OF THE DISCLOSURE

This invention relates to a novel primary electric cell comprising positive electrodes composed of any of the molybdates of silver, copper, iron, cobalt, nickel, mercury, thallium, lead, bismuth and their mixtures, negative electrodes composed of any of the light metals such as Li, Na, K, Ca, Be, Mg and Al, said electrodes being disposed in an electrolyte comprising an organic solvent selected from the group consisting of tetrahydrofuran, N-nitrosodimethylamine, dimethyl sulfite, propylene carbonate, gamma-butyrolactone, dimethyl carbonate, dimethoxy ethane, acetonitrile, dimethyl sulfoxide, dimethyl formamide and the mixtures thereof, and having dissolved therein soluble salts of the light metals, for example, the perchlorates, hexafluorophosphates, tetrafluoroborates, tetrachloro aluminates, hexafluoroarsenates of lithium.

---

We have discovered that the metal salts of the oxyacids of molybdenum can be used as depolarizers in organic electrolyte lithium batteries, hitherto, the depolarizers could not be used in batteries. The cells exhibit excellent discharge characteristics and should be useful for many military and commercial applications.

The object of this invention is to provide a novel organic electrolyte cell with:

(a) high voltage,
(b) high energy density,
(c) long shelf life,
(d) no spontaneous gassing under any circumstances.

The lithium copper molybdate cells were constructed using the procedures described in copending application filed by us, U.S. patent application Ser. No. 55,170 entitled Lithium-Metal Oxide Oragnic Electrolyte Systems.

The "practical" open circuit voltage of the cell was 2.6 volts. On load (4.5 ma. constant drain, 1.0 ma./cm.² C.D. and 30–40 hour rate) the initial operating voltage was 1.8 volt. The average operating voltage was found to be 1.4 volt. The discharge curve is shown in the figure. The theoretical energy density of the cell was found to be 565 w. hr./lb. The cathodic reaction was assumed to be:

$$CuMoO_4 + 4Li^+ + 4e \rightarrow MoO_2 + Cu + 2Li_2O \quad (1)$$

The material utilization efficiency, based on the above reaction was 100% up to the 1.1 volt end point. The higher oxidation states of both the copper ($Cu^{2+}$) and the molybdenum ($Mo^{+6}$) were utilized in the discharge reaction (1) thereby increasing the realized volumetric capacity of the pure depolarizer, namely 560 ma. hr./gm. compared to 280 ma. hr./gm. for the $MoO_3$ depolarizer.

The scope of this invention extends to other metal molybdates, e.g., molybdates of Ag, Fe, Co, Ni, Hg, Tl, Pb and Bi.

The scope of this invention extends to other metal anodes, solvent, electrolytes, and structures mentioned in our aforesaid copending application Ser. No. 55,170 filed herewith and Ser. No. 853,312 filed on Aug. 27, 1969, and Ser. No. 829,849 filed May 27, 1969, the latter two filed by one of us as sole inventor, said Ser. No. 829,849, now abandoned other organic electrolyte disclosures.

What is claimed is:

1. A high energy density cell comprising a positive electrode consisting of copper molybdate; a negative electrode consisting essentially of lithium metal; said electrodes being disposed in an electrolyte comprising an organic solvent selected from the group consisting of tetrahydrofuran, N-nitrosodimethylamine, dimethyl sulfite, propylene carbonate, gamma-butyrolactone, dimethyl carbonate, dimethoxy ethane, acetonitrile, dimethyl sulfoxide, dimethyl formamide, and mixtures thereof, and having dissolved therein soluble salts of said light metals.

2. The cell in claim 1 wherein the positive electrode comprises a mixture of said copper molybdate with an electronically conductive diluent.

3. The cell in claim 2 wherein the electronically conductive diluent is graphite.

4. The cell in claim 1 wherein the electrolyte consists essentially of a solution of lithium perchlorate in tetrahydrofuran.

References Cited

UNITED STATES PATENTS

| | | | |
|---|---|---|---|
| 3,415,687 | 12/1968 | Methlie | 136—100 R |
| 3,423,242 | 1/1969 | Meyers et al. | 136—6 |
| 3,362,817 | 7/1966 | Thompson | 136—86 D |
| 3,502,506 | 3/1970 | Broyde | 136—120 FC |
| 3,468,716 | 9/1969 | Eisenberg | 136—100 R |

WINSTON A. DOUGLAS, Primary Examiner
C. F. LEFEVOUR, Assistant Examiner

U.S. Cl. X.R.
136—23